US011228052B2

United States Patent
Song et al.

(10) Patent No.: US 11,228,052 B2
(45) Date of Patent: Jan. 18, 2022

(54) INTEGRATED HYDROGEN RECYCLE SYSTEM USING PRESSURIZED MULTICHAMBER TANK

(71) Applicant: ESS TECH, INC., Wilsonville, OR (US)

(72) Inventors: Yang Song, West Linn, OR (US); Kenneth Kiyoshi Fisher, Portland, OR (US); Timothy McDonald, Portland, OR (US)

(73) Assignee: ESS TECH, INC., Wilsonville, OR (US)

( * ) Notice: Subject to any disclaimer, the term of this patent is extended or adjusted under 35 U.S.C. 154(b) by 116 days.

(21) Appl. No.: 15/965,627

(22) Filed: Apr. 27, 2018

(65) Prior Publication Data

US 2018/0316035 A1 Nov. 1, 2018

Related U.S. Application Data

(60) Provisional application No. 62/491,973, filed on Apr. 28, 2017.

(51) Int. Cl.
*H01M 8/18* (2006.01)
*H01M 8/04082* (2016.01)
(Continued)

(52) U.S. Cl.
CPC ......... *H01M 8/188* (2013.01); *H01M 8/0202* (2013.01); *H01M 8/0289* (2013.01);
(Continued)

(58) Field of Classification Search
CPC ............... H01M 8/188; H01M 8/2484; H01M 8/2455; H01M 8/0202; H01M 8/04037;
(Continued)

(56) References Cited

U.S. PATENT DOCUMENTS 6,692,862 B1 2/2004 Zocchi
6,761,945 B1 7/2004 Adachi et al.
(Continued)

FOREIGN PATENT DOCUMENTS

CN 104143649 A 11/2014
JP 2015504233 A 2/2015
(Continued)

OTHER PUBLICATIONS

ISA Korean Intellectual Property Office, International Search Report and Written Opinion Issued in Application No. PCT/US2018/029992, dated Sep. 11, 2018, WIPO, 11 pages.
(Continued)

*Primary Examiner* — Christian Roldan
(74) *Attorney, Agent, or Firm* — McCoy Russell LLP

(57) ABSTRACT

A multi-chambered electrolyte storage tank for a redox flow battery system, may include first and second electrolyte chambers, and a bulkhead, wherein the first and second electrolyte chambers are fluidly coupled to first and second sides of a redox flow battery cell, respectively, the first and second electrolyte chambers include first and second liquid electrolyte volumes, respectively, and the first and second liquid electrolyte volumes are separated by the bulkhead positioned therebetween. In this way, manufacturing and operational complexity of a redox flow battery system can be reduced.

13 Claims, 8 Drawing Sheets

(51) Int. Cl.
| | |
|---|---|
| *H01M 8/04089* | (2016.01) |
| *H01M 8/04007* | (2016.01) |
| *H01M 8/2455* | (2016.01) |
| *H01M 8/0202* | (2016.01) |
| *H01M 8/0289* | (2016.01) |
| *H01M 8/2484* | (2016.01) |

(52) U.S. Cl.
CPC ............ *H01M 8/04037* (2013.01); *H01M 8/04097* (2013.01); *H01M 8/04201* (2013.01); *H01M 8/2455* (2013.01); *H01M 8/2484* (2016.02); *Y02E 60/50* (2013.01)

(58) Field of Classification Search
CPC ......... H01M 8/04201; H01M 8/04097; H01M 8/0289; Y02E 60/528
USPC ........................................ 429/105
See application file for complete search history.

(56) References Cited

U.S. PATENT DOCUMENTS

| | | | |
|---|---|---|---|
| 7,800,345 | B2 | 9/2010 | Yun et al. |
| 9,509,011 | B2 | 11/2016 | Evans et al. |
| 2011/0086247 | A1 | 4/2011 | Keshavarz et al. |
| 2014/0072897 | A1* | 3/2014 | Whitehead ............ H01M 8/188 429/451 |
| 2014/0220463 | A1* | 8/2014 | Daniel ............ H01M 8/04425 429/415 |
| 2014/0363747 | A1* | 12/2014 | Evans ................ H01M 8/188 429/409 |
| 2015/0111117 | A1* | 4/2015 | Lipka .................. H01M 8/188 429/418 |
| 2015/0255824 | A1 | 9/2015 | Evans et al. |
| 2016/0006054 | A1* | 1/2016 | Li ........................ H01M 8/188 429/418 |
| 2016/0093925 | A1 | 3/2016 | Li et al. |
| 2016/0293992 | A1 | 10/2016 | Song et al. |
| 2019/0131639 | A1* | 5/2019 | Wu .................... H01M 8/04873 |

FOREIGN PATENT DOCUMENTS

| | | |
|---|---|---|
| WO | 03069692 A2 | 8/2003 |
| WO | 2009106452 A1 | 9/2009 |
| WO | 2010118060 A1 | 10/2010 |
| WO | 2012135473 A2 | 10/2012 |
| WO | 2013027076 A1 | 2/2013 |
| WO | 2018201093 A1 | 11/2018 |

OTHER PUBLICATIONS

Song, Y. et al., "Methods and System for a Battery," U.S. Appl. No. 15/965,673, filed Apr. 27, 2018, 66 pages.

Song, Y. et al., "Methods and Systems for Operating a Redox Flow Battery System," U.S. Appl. No. 15/965,709, filed Apr. 27, 2018, 44 pages.

Evans, C., "Methods and Systems for Rebalancing Electrolytes for a Redox Flow Battery System," U.S. Appl. No. 15/965,728, filed Apr. 27, 2018, 50 pages.

Song, Y. et al., "Methods and Systems for Redox Flow Battery Electrolyte Hydration," U.S. Appl. No. 15/965,671, filed Apr. 27, 2018, 56 pages.

Song, Y. et al., "Flow Battery Cleansing Cycle To Maintain Electrolyte Health and System Performance," U.S. Appl. No. 15/965,722, filed Apr. 27, 2018, 56 pages.

European Patent Office, Extended European Search Report Issued in Application No. 18789951.3, dated Jan. 11, 2021, Germany, 9 pages.

* cited by examiner

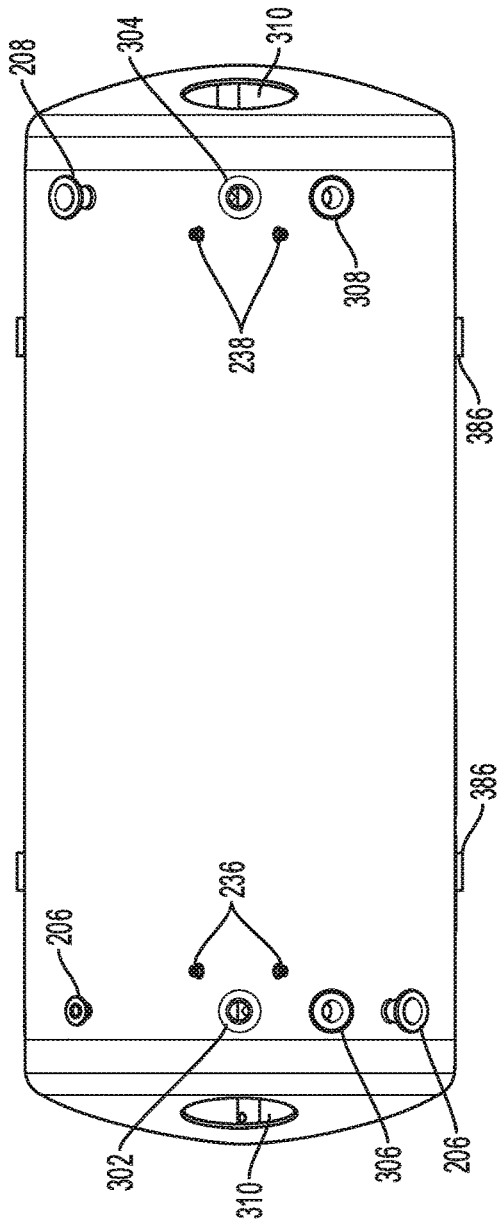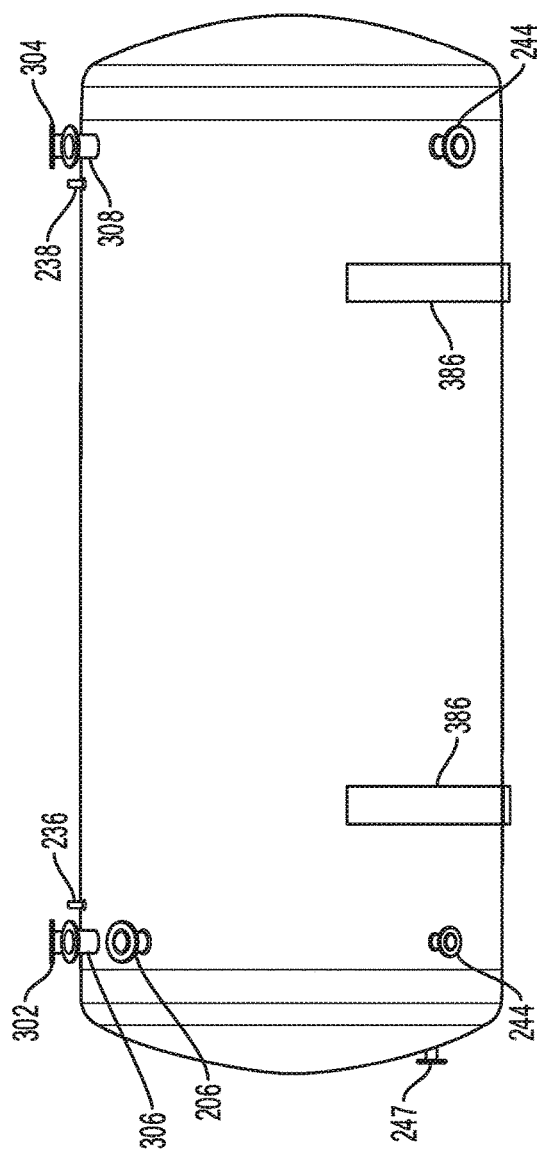

INTEGRATED HYDROGEN RECYCLE SYSTEM USING PRESSURIZED MULTICHAMBER TANK

CROSS REFERENCE TO RELATED APPLICATIONS

The present application claims priority to U.S. Provisional Application No. 62/491,973, entitled "Integrated Hydrogen Recycle System Using Pressurized Multichamber Tank", and filed on Apr. 28, 2017. The entire contents of the above-listed application are hereby incorporated by reference for all purposes.

ACKNOWLEDGMENT OF GOVERNMENT SUPPORT

This invention was made with government support under contract no. DEAR0000261 awarded by the DOE, Office of ARPA-E. The government has certain rights in the invention.

FIELD

The present description relates generally to flow battery systems.

BACKGROUND AND SUMMARY

Conventional redox flow battery systems may utilize separate, standalone tanks for storing/supplying each of the positive and negative electrolytes, with each tank having its own footprint, and each tank undergoing inert gas purging during operation of the redox flow battery system, as shown in FIG. 7. An additional standalone tank can be employed for hydrogen gas storage/supply. Such redox flow battery systems may include a dedicated gas/liquid separation system 600, including a separator for each of the positive and negative electrolyte tanks; the gas/liquid separation system may be employed to separate hydrogen gas from the positive and negative electrolytes, whereby the hydrogen gas is concentrated with an accumulator, before being stored in a dedicated hydrogen storage tank, as shown in FIG. 6. As a result, conventional redox flow battery systems can include many auxiliary process units, which increases manufacturing costs and operational complexity.

In one embodiment, the above issues may be at least partially addressed by a multi-chambered electrolyte storage tank for a redox flow battery system, including first and second electrolyte chambers, and a bulkhead, wherein the first and second electrolyte chambers are fluidly coupled to first and second sides of a redox flow battery cell, respectively, the first and second electrolyte chambers include first and second liquid electrolyte volumes, respectively, and the first and second liquid electrolyte volumes are separated by the bulkhead positioned therebetween.

In this way, several auxiliary process units such as gas/liquid separators and dedicated gas storage tanks can be precluded, reducing manufacturing and operational complexity. Furthermore, integrating the electrolyte chambers and gas storage within a single multi-chambered electrolyte storage tank can substantially simplify the redox flow battery system layout and reduce the system footprint. Furthermore, storage of hydrogen gas in a head space above the liquid electrolyte chambers in the multi-chambered electrolyte storage tank allows for spontaneous gas-liquid separation, while providing an inert gas blanket for the liquid electrolyte, thereby reducing oxidation of the liquid electrolyte and reducing capacity losses of the redox flow battery system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3A and 3B show top and side perspective exterior views of the multi-chambered electrolyte storage tank of FIG. 1, respectively.

DETAILED DESCRIPTION

Figure 1:
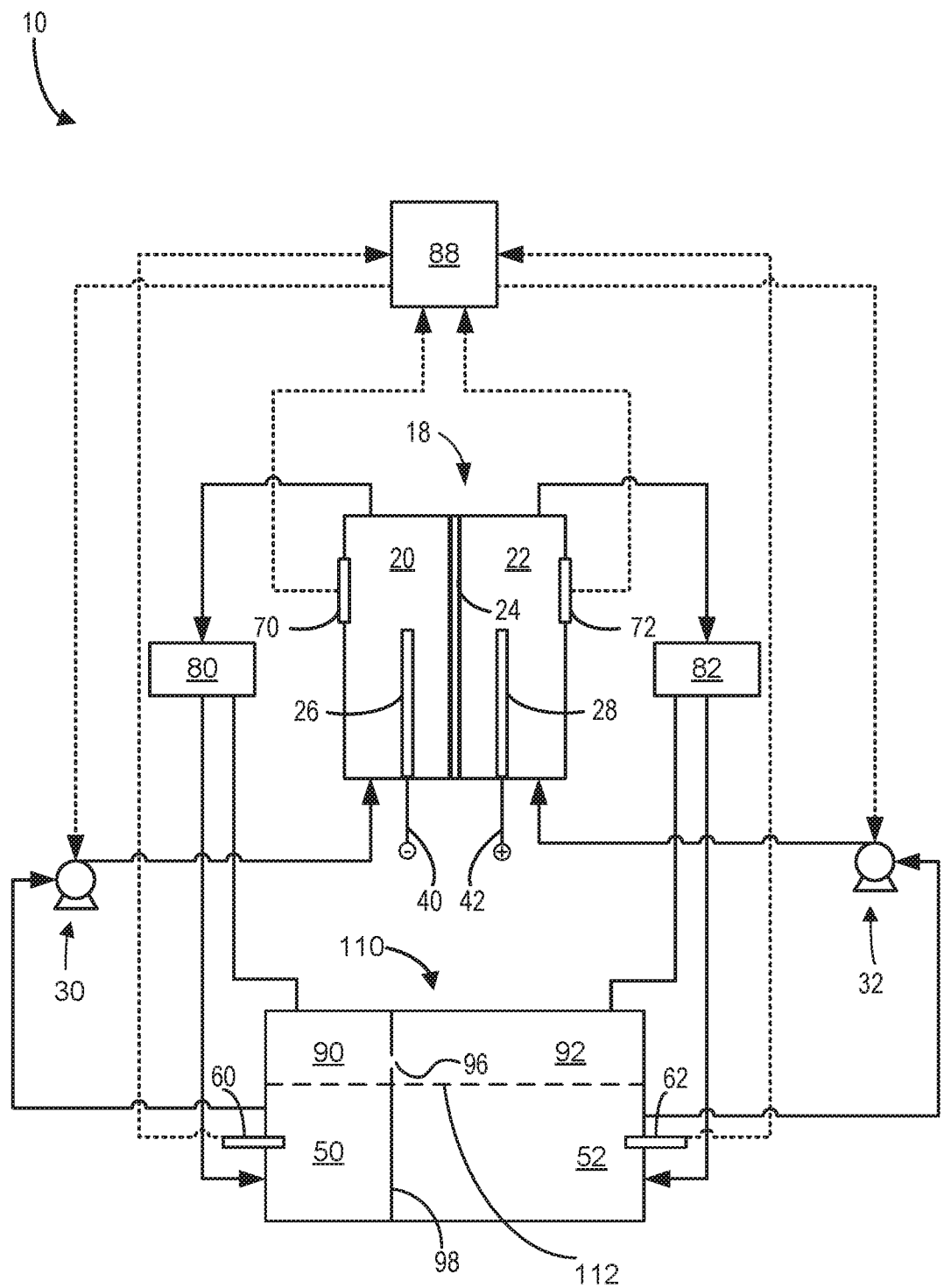
FIG. 1 shows a schematic representation of a redox flow battery system having a multi-chambered electrolyte storage tank.

The following description involves a flow battery system with an integrated multi-chambered electrolyte storage tank. A flow battery system, as described herein, may include a redox flow battery system. The integrated multi-chambered electrolyte storage tank is designed to hold both positive and negative electrolytes (energy). As such, the design of the multi-chambered electrolyte storage tank reduces overall tank and flow battery system footprint, resulting in increased system energy density, and an overall simplified system, as compared to conventional flow battery systems having multiple electrolyte storage tanks. The multi-chambered electrolyte storage tank may further achieve increased hydrogen separation, provide for hydrogen storage, provide a non-oxidant blanket for liquid electrolyte protection from oxidation, and have the ability to withhold pressure to increase gas storage volume. In one example, the multi-chambered electrolyte storage tank 110 is divided into two chambers, with one chamber used to store a first electrolyte and the other chamber used to store a second electrolyte. Furthermore, the multi-chambered electrolyte storage tank 110 may separate hydrogen from liquid electrolyte solution after liquid electrolyte with entrained hydrogen gas is returned to the tank from the cells of the flow battery system. Further still, the multi-chambered electrolyte storage tank may store the separated and recaptured hydrogen gas, and can supply the hydrogen gas to the flow battery system.

Hybrid redox flow batteries are redox flow batteries that are characterized by the deposit of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

In a redox flow battery system the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Accordingly, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

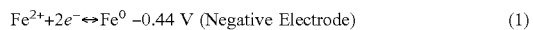
$$Fe^{2+}+2e^- \leftrightarrow Fe^0 \quad -0.44 \text{ V (Negative Electrode)} \quad (1)$$

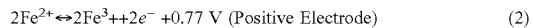
$$2Fe^{2+} \leftrightarrow 2Fe^{3+}+2e^- \quad +0.77 \text{ V (Positive Electrode)} \quad (2)$$

As discussed above, the negative electrolyte used in the all iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate causing it to plate onto the negative electrode.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as positive electrolyte chamber 52 or an external positive electrolyte tank. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as negative electrolyte chamber 50 or an external negative electrolyte tank to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of $Fe(OH)_3$. Precipitation of $Fe(OH)_3$ can damage the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Figure 2:
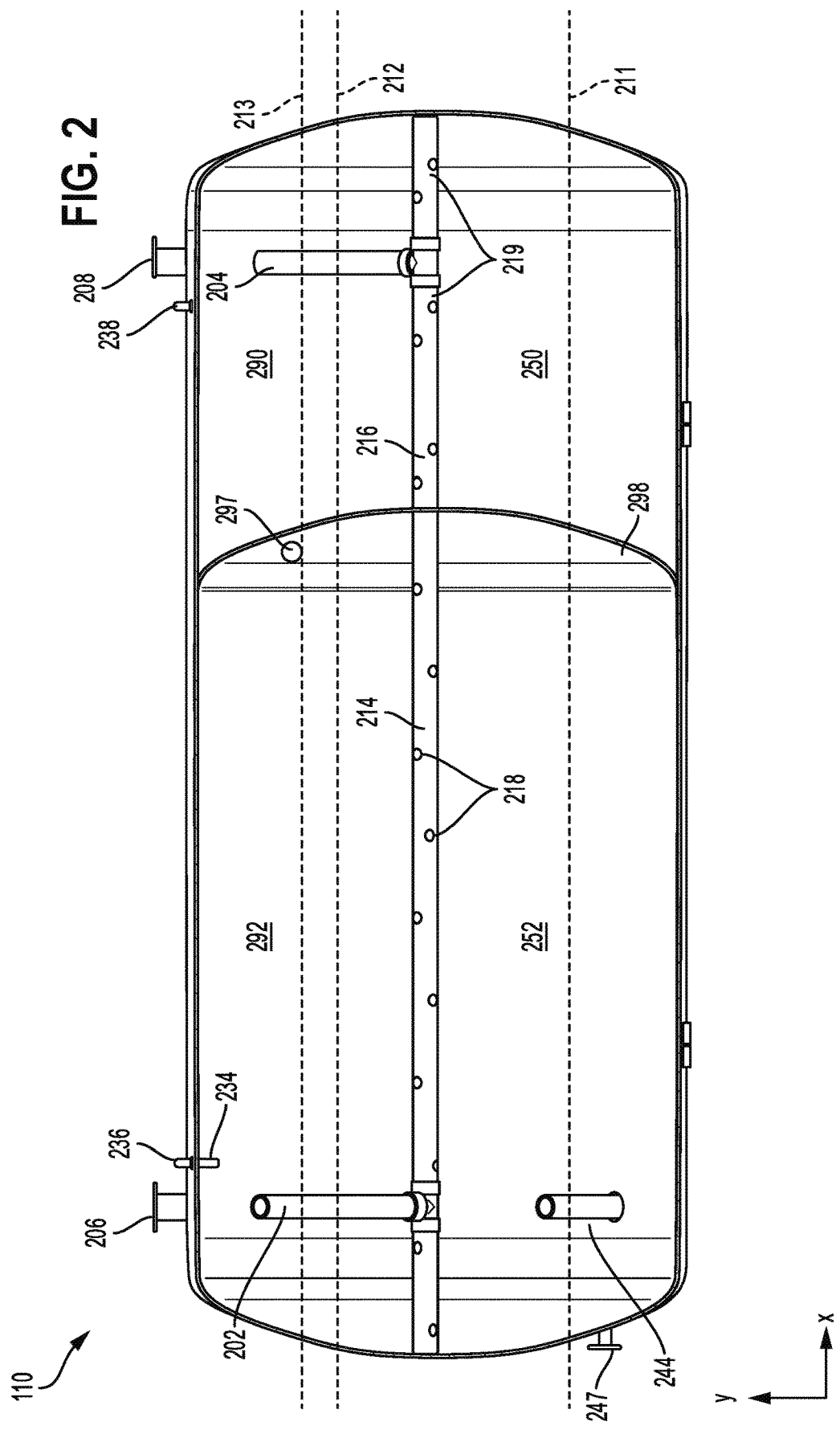
FIG. 2 shows a longitudinal cross-sectional internal view of the multi-chambered electrolyte storage tank of FIG. 1.
Figure 4:
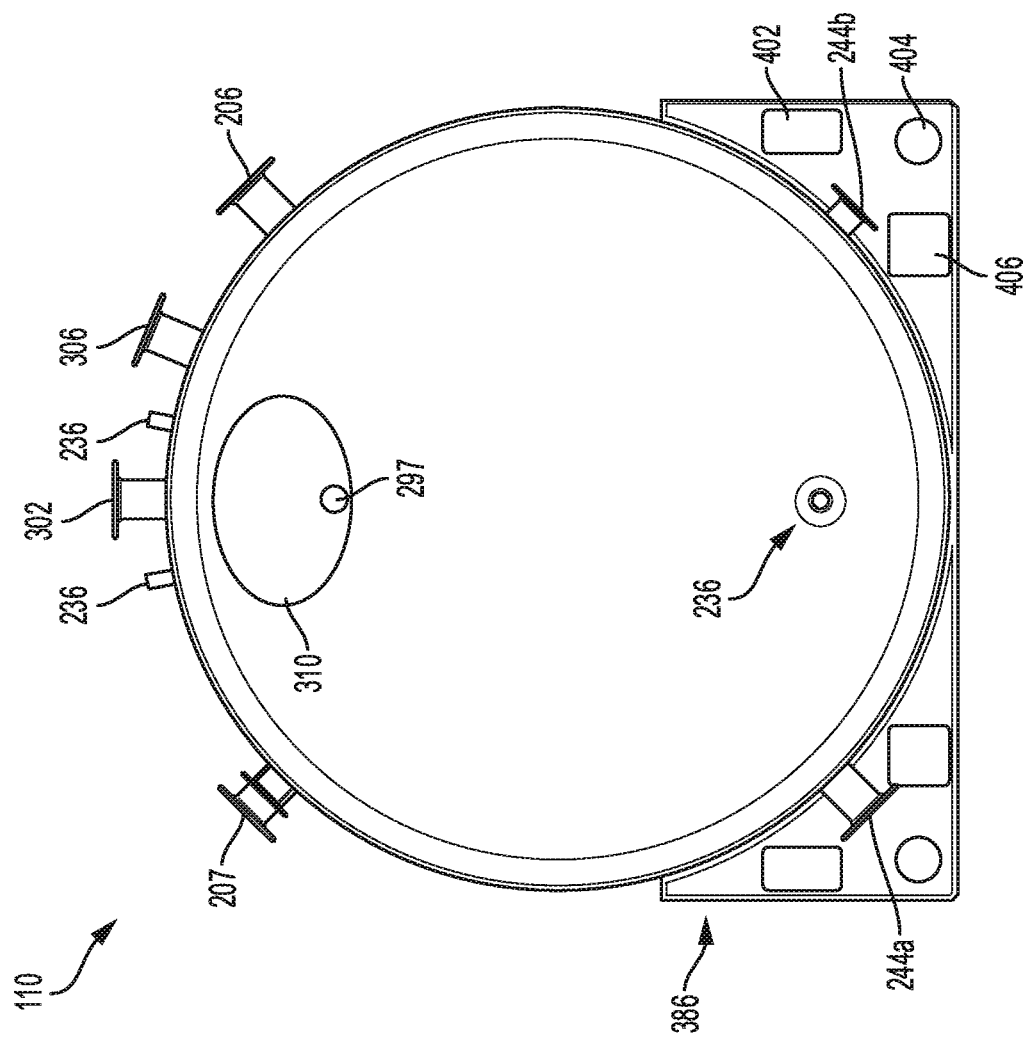
FIG. 4 shows an end perspective exterior view of the multi-chambered electrolyte storage tank of FIG. 1
Figure 5A:
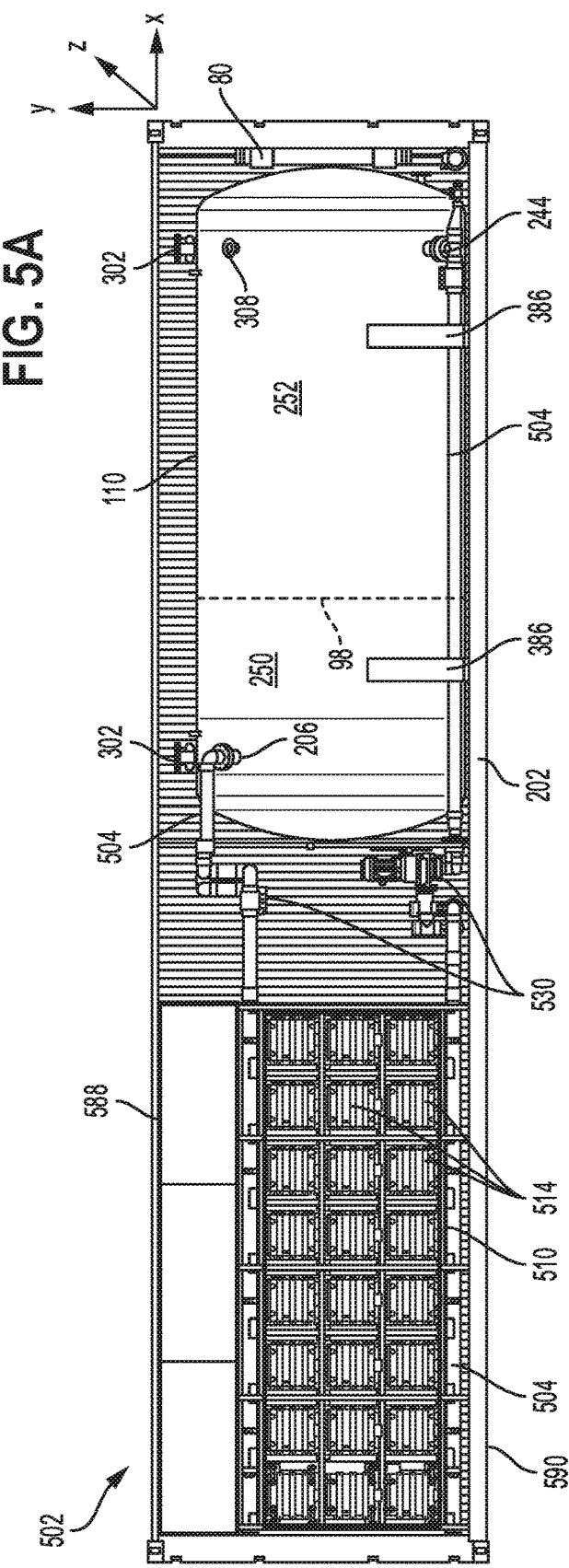
FIGS. 5A and 5B show both side and top perspective views of an example layout of a flow battery system, including the redox flow battery system with the multi-chambered electrolyte storage tank of FIG. 1.
Figure 5B:
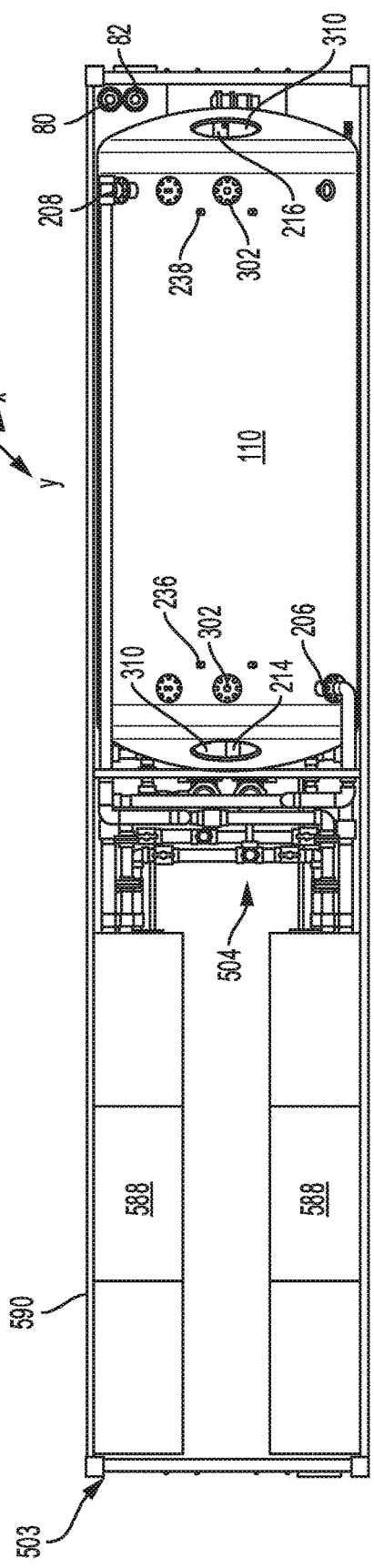
Figure 6:
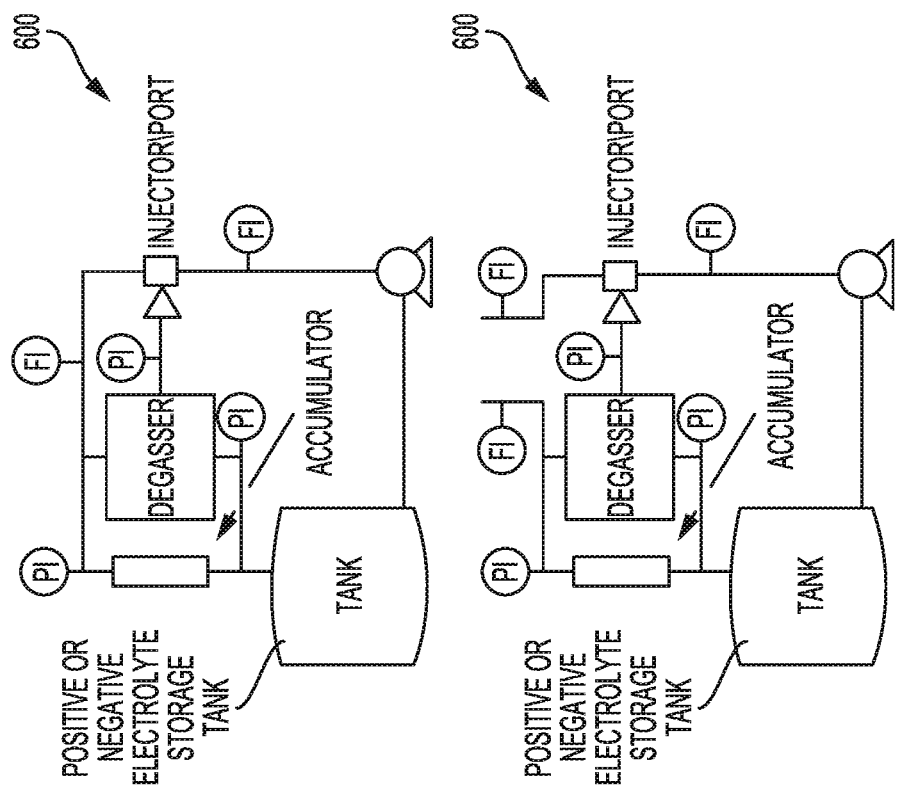
FIG. 6 shows a schematic diagram of a conventional hydrogen separation and storage setup used in a flow battery system.
Figure 7:
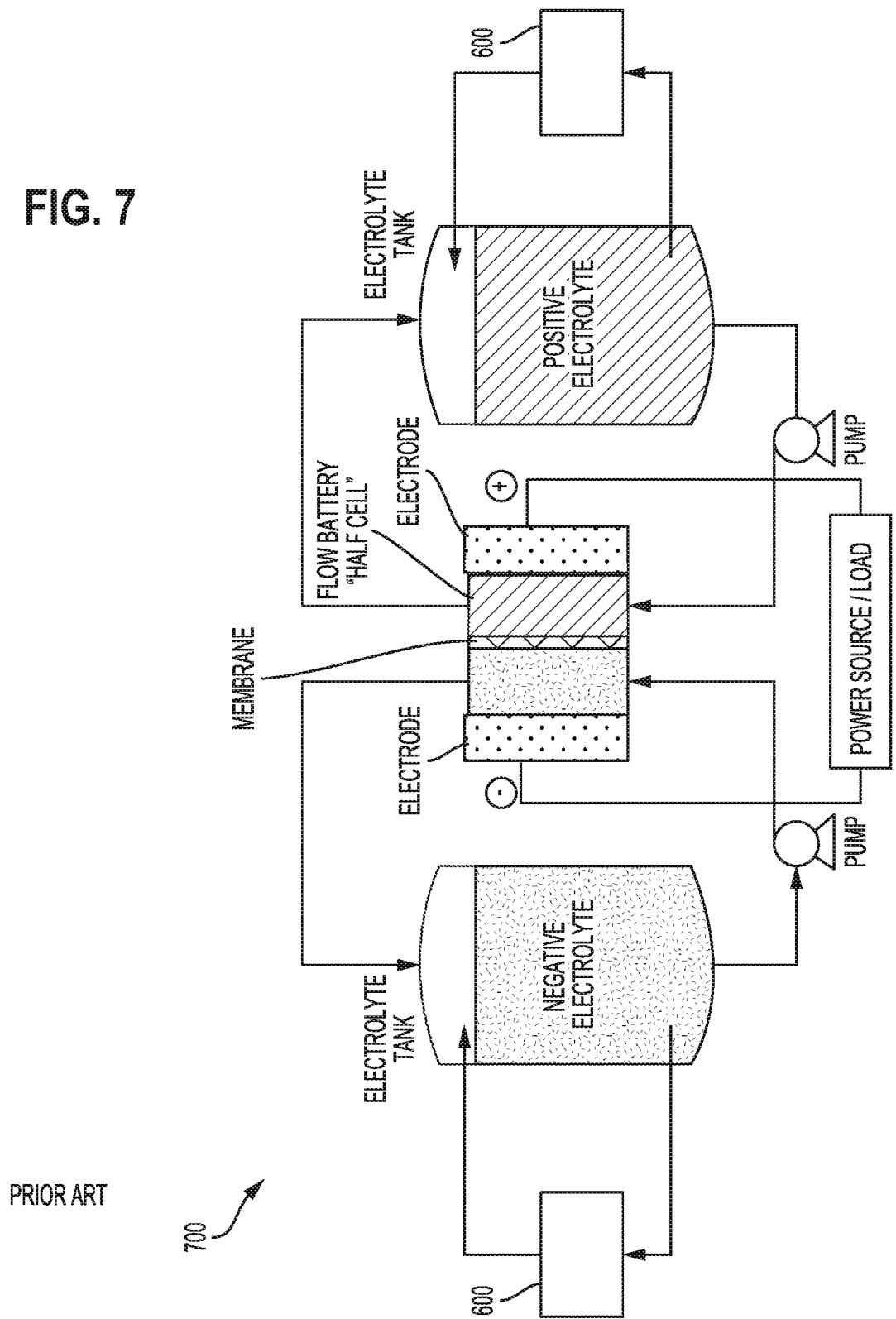
FIG. 7 shows a diagram of a flow battery system with two separate electrolyte storage tanks.

FIG. 1 is a schematic drawing of a redox flow battery system. FIGS. 2-4 illustrate various perspective views of a multi-chamber, pressurized electrolyte storage tank, including the integrated multi-chambered electrolyte storage tank shown in FIG. 1 and that may be coupled to the redox flow battery system in FIG. 1. FIGS. 5A and 5B illustrate both side and top perspective views of a redox flow battery system layout. FIG. 6 is a schematic representation of traditional hydrogen separation and storage methods employed in a redox flow battery system. FIG. 7 is a schematic representation of a traditional flow battery system with separate positive and negative electrolyte storage tanks.

FIG. 1 provides a schematic illustration of a redox flow battery system 10. The redox flow battery system 10 may comprise a redox flow battery cell 18, fluidly connected to a multi-chambered electrolyte storage tank 110. The redox flow battery cell 18 may generally include a negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane. The negative electrode compartment 20 may comprise a negative electrode 26, and a negative electrolyte comprising electroactive materials. The positive electrode compartment 22 may comprise a positive electrode 28, and a positive electrolyte comprising electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise an integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. FIG. 1 further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. A such, the stored hydrogen gas can aid in purging other gases from the multi-chambered electrolyte storage tank 100, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

The multi-chambered storage tank 110 also includes the spill-over hole 96, which creates an opening in the bulkhead 98 between gas head spaces 90 and 92, and provides a means of equalizing gas pressure between the two chambers. The spill-over hole 96 may be positioned at a threshold height above the fill height 112. The spill-over hole 96 further enables a capability to self-balance the electrolytes in each of the positive and negative electrolyte chambers in the event of electrolyte crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers in response to a liquid level decreasing below a solids fill threshold level. Said in another way, controller 88 may activate the one or more heaters in the negative and positive electrolyte chambers only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte source chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence a packed catalyst bed.

During operation of a redox flow battery system, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. Sensors may be positioned at other locations throughout the redox flow battery system to monitor electrolyte chemical properties and other properties. For example a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88 when hydrating a redox flow battery system in a dry state. Furthermore, controller 88 may send signals to actuators such as valves and pumps of the field hydration system during hydration of the redox flow battery system. Sensor information may be transmitted to a controller 88 which may in turn actuate pumps 30 and 32 to control electrolyte flow through the cell 18, or to perform other control functions, as an example. In this manner, the controller 88 may be responsive to, one or a combination of sensors and probes.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) or an injector (which may be installed in the tank) may regulate the flow of the hydrogen gas from integrated multi-chambered electrolyte storage tank 110.

The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure. In response to the pH increase, controller 88 may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system. For example the time period may be reduced if the recirculation rate is high, and local changes in concentration (e.g., due to side reactions or gas leaks) may quickly be measured since the time constants may be small.

FIG. 2 illustrates an example schematic of a multi-chambered electrolyte storage tank 110 which is designed to store, receive and deliver electrolyte solution as part of a flow battery system, such as the redox flow battery system of FIG. 1. FIG. 2 depicts a longitudinal cross section of the multi-chambered storage tank 110, showing its internal layout. In one example, the integrated multi-chambered storage tank 110 may include a single horizontal cylindrical fiberglass reinforced plastic (FRP) tank with walls thick enough to support an internal tank pressure greater than a threshold tank pressure. In one example, the wall thickness may be ⅜" or thicker and the threshold tank pressure may be 20 psi or greater. The threshold tank pressure may correspond to a pressure equal to or greater than a pressure exerted by hydrogen gas stored therein during operation of the redox flow battery system. Inlet and outlet piping connections to and from the integrated multi-chambered electrolyte storage tank may include flanged sealable connections that can maintain the threshold tank pressure or pressures up to and greater than the threshold tank pressure. Integrated multi-chambered electrolyte storage tank 110 is internally divided into a first electrolyte chamber 252 and a second electrolyte chamber 250. In the example of FIG. 1, the first electrolyte chamber 252 and the second electrolyte chamber 250 correspond to the positive electrolyte chamber 52 and the negative electrolyte chamber 50. Bulkhead 298 may fluidly separate and decouple the first and second electrolyte chambers 252 and 250, except at a spill-over hole 297. Spill-over hole 297 creates an opening in the bulkhead 298, for equilibrating gas pressures and compositions between the first and second electrolyte chambers 252 and 250. Furthermore, in the event of an electrolyte crossover or mixing, filling the first and second electrolyte chambers 252 and 250 above the spill-over threshold level 213 of the spill-over hole may allow for intermixing between first and second electrolyte chambers 252 and 250.

Illustrated by a dashed line in FIG. 2, a solids threshold fill level 211 indicates a level corresponding to a fill level of dry electrolyte precursor (e.g., salts, and the like) when hydrating and starting-up a redox flow battery system, including previously empty first and second electrolyte chambers 252 and 250. As shown in FIG. 2, the solids threshold fill level 211 may be the same for both first and second electrolyte chambers 252 and 250, but in other examples, the solids threshold fill level 211 may be different for both the first and second electrolyte chambers 252 and 250. In one example, the solids threshold fill level 211 may be 0.6 m above the base of the integrated multi-chambered electrolyte storage tank 110. Also illustrated with a dashed line in FIG. 2 is liquid fill threshold level 212. Liquid fill threshold level 212 may be higher than solids threshold fill level 212, and may indicate a filled height of liquid electrolyte in the integrated multi-chambered electrolyte storage tank 110, during operation mode when the redox flow battery system may be charging, discharging, or idle. In one example, the liquid fill threshold level 212 may include a level of 1.65-1.7 m above the base of the integrated multi-chambered electrolyte storage tank 110. While filling multi-chambered electrolyte storage tank 110 and during operation of the redox flow battery system, a difference between the liquid levels in the first and second electrolyte chambers 252 and 250 may be maintained below a threshold difference, corresponding to a threshold pressure difference. In one example, the threshold difference may be less than 150 mm. The spill-over hole 297 may be positioned at a spill-over threshold level 213 higher than the liquid fill threshold level 212, corresponding to a liquid fill level above which liquid electrolyte may flow through and intermix between the first and second electrolyte chambers 252 and 250. As shown in FIG. 2, in one example, the spill-over threshold level 213 may include 75 mm above the liquid fill threshold level 212.

Further shown in the FIG. 2, gas head spaces 292 and 290 are located above the liquid volumes of the first and second electrolyte chambers 252 and 250. For example, during operation of the redox flow battery system 10, when the liquid volumes of the first and second electrolyte chambers 252 and 250 may be at the liquid fill threshold level 212, gas head spaces 292 and 290 may be located above the liquid fill threshold level 212 of the first and second electrolyte chambers 252 and 250, respectively. The gas head spaces 292 and 290 may include hydrogen gas generated through initial hydrogen purging prior to start up or from operation of the redox flow battery (e.g., due to proton reduction and corrosion side reactions at the negative electrode) and conveyed to the integrated multi-chambered electrolyte storage tank 110. For example, hydrogen gas may be entrained with returning liquid electrolyte from the redox flow battery cell 18. As described above, the gas head spaces 292 and 290, are fluidly connected by spill-over hole 297, allowing for equilibration therebetween.

Bulkhead 298 may be oriented to transversely and rigidly divide the integrated multi-chambered electrolyte storage tank 110 into the first and second electrolyte chambers 252 and 250. Positioning of the bulkhead 298 can thus define a volume of the first and second electrolyte chambers 252. In one example, bulkhead 298 may be positioned to set the volume ratio of the first and second electrolyte chambers corresponding to a stoichiometric ratio between the negative and positive redox reactions taking place within a redox flow battery cell 18. In this way, the volume ratios of the liquid electrolyte may aid in maintaining a charge balance between the negative and positive sides of the redox flow battery cells. For the case of an IFB (c.f., redox reaction equations (1) and (2), above), the negative electrode reaction consumes half the amount of iron as the positive electrode because for every mole of $Fe^{2+}$ reduced at the negative electrode (2 moles of charge), 2 moles of $Fe^{3+}$ are oxidized at the positive electrode (2 moles of charge). Accordingly, the bulkhead 298 may be positioned such that a volume of the negative electrolyte chamber 50 may be half the volume of the positive electrolyte chamber 52. The multi-chambered electrolyte storage tank 110 may be sized according to the number of redox flow battery cells 18 in the redox flow battery system. In one example, the multi-chambered electrolyte storage tank 110 may include a volume greater than 21,000 L, including more than 5000 L of gas head space, and about 1000 L of plumbing volume.

Continuing with FIG. 2, electrolyte may be returned from the one or more redox flow battery cells 18 to the first and second electrolyte chambers 250 and 252 by way of first and second electrolyte return pipes 202 and 204 oriented more vertically (e.g., more parallel to the y-axis) within the integrated multi-chambered electrolyte storage tank 110. The first and second electrolyte return pipes 202 and 204 may include return flanges 206 and 208 at ends external to the integrated multi-chambered electrolyte storage tank 110 that allow for making flanged connections with inlet piping that can maintain a hermetic seal up to or greater than the threshold tank pressure. The first and second electrolyte return pipes 202 and 204 may be fluidly coupled inside the integrated multi-chambered electrolyte storage tank 110 to first and second return manifolds 214 and 216, respectively. First and second return manifolds 214 and 216 each include sections of hollow piping with a plurality of openings 218 and 219, respectively, through which returned electrolyte and gas may flow to first and second electrolyte chambers 252 and 250. First and second return manifolds 214 and 216 may be fluidly isolated by the bulkhead 298, and therefore no liquid electrolyte or gas exchanges between the first and second electrolyte chambers 252 and 250 by way of the first and second return manifolds 214 and 216.

As shown in FIG. 2 first and second return manifolds 214 and 216 may be positioned below a liquid fill threshold level 212, thereby returning electrolyte from the redox flow battery cell and any entrained gases therein to a submersed level of the integrated multi-chambered electrolyte storage tank. In one example, the submersed level may be greater than a solids fill level 211, but less than a liquid fill threshold level 212. The solids fill level 211 may correspond to a level in the tank to which solid electrolyte precursors (e.g., salts in powder or granule form) are added when starting-up and commissioning a redox flow battery system in a dry state. The dry state may refer to the redox flow battery system prior to hydration thereof, in the absence of water or other liquid solvents. In another example, the submersed level may coincide with the central longitudinal axis of the integrated multi-chambered electrolyte storage tank 110. First and second return manifolds 214 and 216 may each include lengths of piping oriented more horizontally (more parallel to an x-direction) and spanning a longitudinal axis of the integrated multi-chambered electrolyte storage tank 110. Orienting the first and second return manifolds 214 and 216 more horizontally relative to the more vertically oriented first and second return pipes 202 and 204, respectively, may aid in distribution of returning electrolyte and gas throughout the lengths of the first and second return manifolds 214 and 216 by increasing a hydraulic pressure drop across the length of the first and second return pipes 202 and 204. In this way, positioning the first and second return manifolds 214 and 216 at a lower level (e.g., closer to the solids fill level 211) may also aid in increasing a hydraulic pressure drop across the length of the first and second return pipes 202 and 204. The openings 218 and 219 may be positioned at an upper surface and/or at a lower surface of the first and second return manifolds 214 and 216, respectively. In this way, separation of the returning liquid electrolyte and the entrained gases therein may be encouraged, the entrained gases tending to bubble out of the openings at the upper surface while the returning liquid tending to flow out of the lower surface openings. In this way, the first and second return manifolds 214 and 216 can facilitate spontaneous gas/liquid separation, and more homogeneous return electrolyte within the integrated multi-chambered electrolyte storage tank 110.

Continuing with FIG. 2, one or more liquid outlets 244 (liquid outlet at second electrolyte chamber 250 not visible due to perspective of cross-sectional cutaway) from each of the first and second electrolyte chambers may be used to supply electrolyte to the flow battery cells 18 and/or rebalancing reactors 80 and 82. Piping connections to the liquid outlets 244 may include flanged connections capable of sealing to pressures greater than the threshold tank pressure or higher. Liquid outlets 244 may be positioned towards a lower surface or lower level of the integrated storage tank 110 so that hydraulic pressure may be used to aid in conveying liquid therefrom. For example liquid outlets 244 may be provided from both the first and second electrolyte chambers for supplying liquid electrolyte to the rebalancing reactors 80 and 82 and the redox flow battery cells 18. Furthermore, positioning the liquid outlets 244 towards a bottom surface of the tank can aid in reducing an amount of entrained gas in the liquid outlets. In one example, the opening of the liquid outlets 244 within the multi-chambered electrolyte storage tank 110 may be positioned above the solids fill level 211, which can aid in preventing solids from entering the liquid outlets. Flanged connection 247 may provide a spare liquid coupling port for the integrated multi-chambered electrolyte storage tank, and may be included as a drain, for example.

The integrated multi-chambered electrolyte storage tank 110 may further include one or more gas outlet ports 236 and 238 positioned towards an upper surface from each of the first and second electrolyte chambers 252 and 250, respectively. For example, the gas outlet ports 236 and 238 may be positioned above a liquid fill threshold level 212 and above a spill-over threshold level 213. In this way, the gas outlet ports may be fluidly coupled to and above head spaces 292 and 290, respectively, facilitating supply of hydrogen gas from the integrated multi-chambered electrolyte storage tank to the rebalancing reactor 80 and 82 or receiving hydrogen gas from an external hydrogen gas source. In one example internal hydrogen stub 234 may be connected by flexible tubing to a float positioned at the surface (e.g. gas-liquid interface) of the electrolyte, enabling full purge of the tank gas head space. The integrated multi-chambered electrolyte storage tank 110 may include an internal hydrogen stub 234 fluidly coupled at the gas outlet 236 or at gas outlet 238, or may include two internal hydrogen stubs 234 fluidly coupled to both gas outlets 236 and 238. As previously described, purging the tank gas head space and storing hydrogen gas thereat may facilitate providing a non-oxidant blanket of gas that aids in reducing degradative oxidation of the electrolyte.

Turning now to FIGS. 3A and 3B, they illustrate top and side external views, respectively, of the integrated multi-chambered electrolyte storage tank 110. In the example of FIG. 3A, the first return flange 206, a first level sensor 302, first cable conduit 306, and the first return flange 206 are aligned towards an upper surface of the integrated multi-chambered electrolyte storage tank 110 along a transverse z-axis perpendicular to the longitudinal x-axis, which may aid in more orderly arranging of the electrical and piping connections thereto. The first level sensor 302 may transmit a fluid level of the first electrolyte chamber to a controller 88. The first cable conduit 306 may facilitate electrical coupling of sensors such as thermocouples, conductivity sensors, level sensors, pressure sensors, and other sensors, as well as electrical devices such as heaters at the first electrolyte chamber to a power source located external to the integrated multi-chambered electrolyte storage tank 110. At the second electrolyte chamber side of the multi-chambered electrolyte storage tank 110, the second return flange 208, a second level sensor 304, second cable conduit 308, and the second return flange 208 are aligned towards an upper surface of the integrated multi-chambered electrolyte storage tank 110 along a transverse z-axis perpendicular to the longitudinal x-axis, which may aid in more orderly arranging of the electrical and piping connections thereto. Functions and features of the second level sensor 304 and the second cable conduit 308 are analogous to those described for the first level sensor 304 and first cable conduit 308, but relating to the second electrolyte chamber. Manways 310 are shown located more centrally at either end cap of the integrated multi-chambered electrolyte storage tank 110, providing service entry points for maintenance purposes. Finally, the multi-chambered electrolyte storage tank 110 may be mounted upon and immobilized by at least two support saddles 386 which wrap around a portion of the circumference of the multi-chambered electrolyte storage tank 110 at lower surface thereof and aid in supporting and maintaining stationary position of the multi-chambered electrolyte storage tank 110. In one example, the support saddles 386 may include epoxy-coated steel.

In FIG. 4 an external end view of integrated multi-chambered electrolyte storage tank 110 is provided. The manway 310 can include an ovular shaped opening, facilitating interior access to the tank and a sealable door capable of sealing against gas and liquid leaks up to and greater than the threshold tank pressure. In the example schematic of FIG. 4 the spill-over hole 297 is visible through the open manway 310. Accordingly, manway 310 may be positioned towards the upper surface of the multi-chambered electrolyte storage tank 110 at a spill-over threshold level 213 or higher, in the example schematic shown. Various liquid outlets 244 may include larger liquid outlets 244a and smaller liquid outlets 244b. In one example, larger liquid outlets 244a may be used to convey electrolyte liquids to the redox flow battery cells 18, while smaller liquid outlets 244b may be used to convey electrolyte liquids to the rebalancing reactors 80 and 82. In this way a larger flow rate of liquid electrolyte may be supplied to support charging and discharging rates of the redox flow battery cells.

Two or more support saddles 386 may brace and fix a position of the multi-chambered electrolyte storage tank 110, wrapping around a partial circumference of the lower surface thereof. Support saddles may be attached to the multi-chambered electrolyte storage tank by welds, bolts, and the like. The support saddles 386 may include square openings 406 and rectangular openings 402, which can enable lifting and placement of the integrated multi-chambered electrolyte storage tank 110. In particular, I-beams with rectangular cross-section may span through rectangular openings of multiple support saddles 386 to support and allow lifting and placement of the integrated multi-chambered electrolyte storage tank 110. Furthermore, circular openings 404, may support outlet piping flanged and fluidly connected to the liquid outs 244 (including 244a and 244b) from the integrated multi-chambered electrolyte storage tank 110.

Turning now to FIGS. 5A and 5B, they illustrate a side view 502 and a top view 503 of an example redox flow battery system layout for the redox flow battery system 10.

Redox flow battery system layout may be housed within a rigid housing 590 that facilitates long-distance transport and delivery of the redox flow battery system. In some examples, the housing 590 can include a standard steel freight container or a freight trailer that can be transported via rail, truck or ship. The system layout can include the integrated multi-chambered electrolyte storage tank 110 and rebalancing reactors 80 and 82 positioned at a first side of the housing 590, and a power module 510, and power control system (PCS) 588 at a second side of the housing 590. Auxiliary components such as support saddles 386, as well as various piping 504, pumps 530, valves (not shown), and the like may be included within the housing 590 (as further described with reference to FIG. 1) for stabilizing and fluidly connecting the various components positioned therein. For example, one or more pumps 530 (including electrolyte pumps 30 and 32) may be utilized to convey electrolyte from the integrated multi-chambered storage tank 110 to one or more battery cell stacks 514 within the power module 510. Furthermore additional pumps 530 may be utilized to return electrolyte from the power module 510 to the first and second electrolyte chambers 250 and 252 of the integrated multi-chambered electrolyte storage tank 110. Piping 504 may include piping fluidly coupled to first and second return flanges 206 and 208 for returning liquid electrolyte from the power module 510 to the multi-chambered electrolyte storage tank 110. Piping 504 may further include piping fluidly coupled to the liquid outlets 244 for supplying liquid electrolyte to the rebalancing reactors 80 and 82 and the power module 510.

Power module 510 may comprise one or more redox flow battery cell stacks 514 electrically connected in parallel and/or in series. Each of the redox flow battery cell stacks 514 may further comprise a plurality of redox flow battery cells 18 connected in parallel and/or series. In this way, power module 510 may be able to supply a range of current and/or voltages to external loads. The PCS 588 includes controller 88, as well as other electronics, for controlling and monitoring operation of the redox flow battery system 10. Furthermore, PCS 588 may regulate and monitor voltage supplied to external loads, as well as supplying current and/or voltage from external sources for charging of the power module 510. The PCS 588 may further regulate and control operation of the redox flow battery system during an idle state. As such PCS 588 may be electrically coupled to the various sensors and actuators of the redox flow battery system 10, including the various sensors and actuators of the multi-chambered electrolyte storage tank.

Thus, in one example, a multi-chambered electrolyte storage tank for a redox flow battery system may include first and second electrolyte chambers, and a bulkhead, wherein the first and second electrolyte chambers are fluidly coupled to first and second sides of a redox flow battery cell, respectively, the first and second electrolyte chambers include first and second liquid electrolyte volumes, respectively, and the first and second liquid electrolyte volumes are separated by the bulkhead positioned therebetween. A second example of the multi-chambered electrolyte storage tank optionally includes the first example, and further includes first and second return inlets fluidly coupled to the first and second electrolyte chambers, respectively, the first and second return inlets delivering returned fluids to submersed positions in the first and second volumes, respectively. A third example of the multi-chambered electrolyte storage tank optionally includes the first and second examples, and further includes first and second return manifolds submersed and fluidly coupled to the submersed positions in the first and second volumes, respectively. A fourth example of the multi-chambered electrolyte storage tank optionally includes the first through third examples, and further includes wherein the first and second return manifolds include liquid electrolyte and entrained gases therein returned from the redox flow battery cell. A fifth example of the multi-chambered electrolyte storage tank optionally includes the first through fourth examples, and further includes wherein the first and second liquid electrolyte volumes fill the first and second electrolyte chambers to first and second liquid fill threshold levels, respectively. A sixth example of the multi-chambered electrolyte storage tank optionally includes the first through fifth examples, and further includes wherein the first and second return manifolds are positioned below the first and second liquid fill threshold levels, respectively, and above the first and second solids fill threshold levels, respectively. A seventh example of the multi-chambered electrolyte storage tank optionally includes the first through sixth examples, and further includes a liquid outlet positioned in each of the first and second electrolyte chambers above the first and second solids fill threshold levels and below the first and second return manifolds. In another representation, the first and second solids fill threshold levels correspond to a level to which dry electrolyte precursors are added when commissioning the redox flow battery system in a dry state, the dry state including in the absence of water or other liquid solvents. An eighth example of the multi-chambered electrolyte storage tank optionally includes the first through seventh examples, and further includes wherein the first and second return manifolds each comprise more horizontally oriented pipes fluidly coupled to the first and second return inlets at the submersed positions, the first and second return inlets comprising more vertically oriented pipes. An ninth example of the multi-chambered electrolyte storage tank optionally includes the first through eighth examples, and further includes wherein the more horizontally oriented pipes include upper and lower openings in an upper and lower surfaces, respectively, of the more horizontally oriented pipes through which the returned liquids and entrained gases therewith may exit the first and second return manifolds.

Thus, in one example, a redox flow battery system may include a negative electrolyte chamber fluidly coupled to a negative electrode compartment of a redox flow battery cell, and a positive electrolyte chamber fluidly coupled to a positive electrode compartment of the redox flow battery cell, and a multi-chambered electrolyte storage tank including the negative electrolyte chamber and the positive electrolyte chamber separated by a bulkhead. A second example of the a redox flow battery system may optionally include the first example, and may further include wherein the negative and positive electrolyte chambers include negative and positive liquid electrolyte filled to negative and positive liquid threshold levels, respectively, wherein the negative and positive liquid electrolyte are separated by the bulkhead. A third example of the a redox flow battery system may optionally include the first and second examples, and may further include wherein the multi-chambered electrolyte storage tank further comprises a gas head space, the gas head space positioned above and fluidly coupled without piping to both the negative and positive liquid electrolyte. A fourth example of the a redox flow battery system may optionally include the first through third examples, and may further include wherein the bulkhead further includes a spill hole above the negative and positive liquid electrolyte levels and fluidly contacting the gas head space, wherein the negative and positive electrode compartments would be fluidly decoupled in the absence of the spill hole. A fifth example of the a redox flow battery system may optionally include the first through fourth examples, and may further include wherein the bulkhead comprises a vertical rigid panel occupying a transverse cross section of the multi-chambered electrolyte storage tank without including a cross section of the spill hole.

Figure 8:
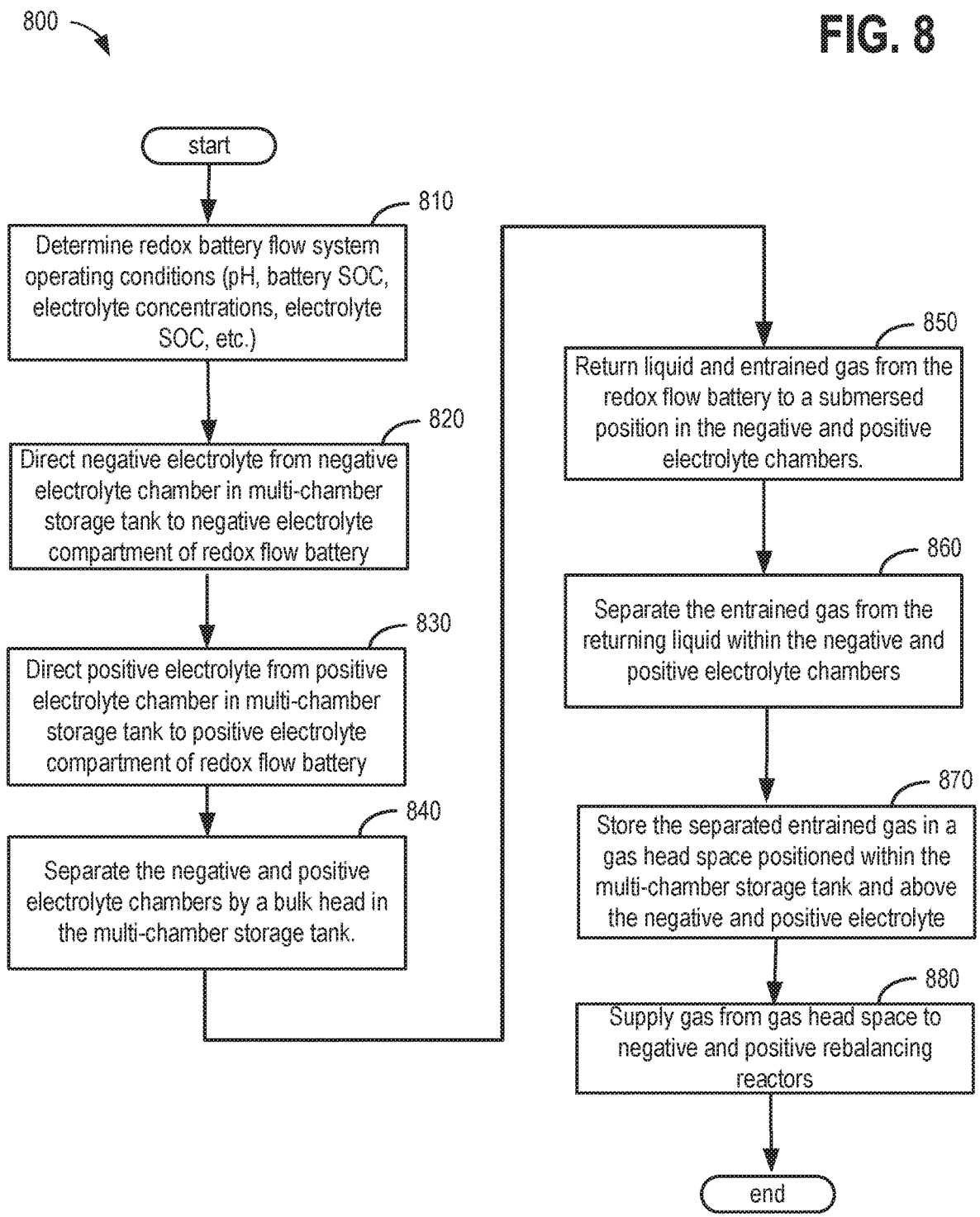
FIG. 8 shows an example flow chart for operating the redox flow battery system of FIG. 1, including the multi-chambered electrolyte storage tank.

Turning now to FIG. 8, it illustrates an example flow chart for a method 800 of operating the redox flow battery system of FIG. 1, including the multi-chambered electrolyte storage tank. Method 800 may include executable instructions residing in non-transitory memory on board a controller, such as controller 88. Controller 88 may thus execute at least a portion of method 800 during operation of the redox flow battery system. Method 800 begins at 810, where the controller 88 estimates and/or measures redox flow battery system operating conditions such as pH, battery SOC, electrolyte concentrations, electrolyte SOC, power module voltage, operation status (e.g., charging, discharge, or idle mode), and the like. At 820, method 800 continues by directing negative electrolyte from the negative electrolyte chamber of the multi-chambered electrolyte storage tank to the negative electrode compartment of the redox flow battery. In one example, directing negative electrolyte from the negative electrolyte chamber of the multi-chambered electrolyte storage tank to the negative electrode compartment of the redox flow battery may include pumping the negative electrolyte from the negative electrolyte chamber 50 to the negative electrode compartment 20. Furthermore, controller 88 may send a signal to negative electrolyte pump 30 to supply negative electrolyte from the negative electrolyte chamber 50 to the negative electrode compartment 20 at a set flow rate, and the set flow rate may depend on if the redox flow battery system is charging, discharging, or idle. Negative electrolyte flow rate during charging and discharging operation may be greater than electrolyte flow rate during idle operation.

Next at 830, method 800 may direct positive electrolyte from the positive electrolyte chamber of the multi-chambered electrolyte storage tank to the positive electrode compartment of the redox flow battery. In one example, directing positive electrolyte from the positive electrolyte chamber of the multi-chambered electrolyte storage tank to the positive electrode compartment of the redox flow battery may include pumping the positive electrolyte from the positive electrolyte chamber 52 to the positive electrode compartment 22. Furthermore, controller 88 may send a signal to positive electrolyte pump 32 to supply positive electrolyte from the positive electrolyte chamber 52 to the positive electrode compartment 22 at a set flow rate, and the set flow rate may depend on if the redox flow battery system is charging, discharging, or idle. Positive electrolyte flow rate during charging and discharging operation may be greater than electrolyte flow rate during idle operation.

At step 840, method 800 may include fluidly separating the negative and positive electrolyte by directing them to the negative and positive electrolyte chambers 50 and 52 separated by a bulkhead 98 positioned in the multi-chambered electrolyte storage tank 110. As described above, the bulkhead 98 may separate the liquid negative electrolyte from the liquid positive electrolyte within the multi-chambered electrolyte storage tank 110. Furthermore, the gas head spaces above the liquid negative electrolyte and the positive liquid electrolyte may be pressure-equilibrated by way of a spill-over hole positioned above the negative and positive liquid threshold fill levels of the negative and positive electrolyte chambers, respectively. Further still, the bulkhead may be positioned to define a volume ratio between the negative and positive electrolyte chambers corresponding to a stoichiometric ratio of liquid electrolyte consumption between the negative and positive redox reactions.

Continuing at step 850, the controller 88 may return negative and positive liquid electrolyte, including entrained gas therewith, from the redox flow battery cell to a submersed position in the negative and positive electrolyte chambers 50 and 52, respectively. The returned liquid electrolyte and entrained gas may be directed to a submersed position below the negative and positive liquid threshold fill levels by way of return inlets fluidly coupled to return manifolds positioned below the liquid threshold fill levels in each of the negative and positive electrolyte chambers of the multi-chambered electrolyte storage tank. Returning liquid electrolyte, including entrained gas therewith, may also flow from the redox flow battery cell through one or more of rebalancing reactors 80 and 82 undergoing electrolyte charge rebalancing therein, prior returning to the multi-chambered electrolyte storage tank 110.

Next, at 860, method 800 continues by separating the entrained gas from the returning liquid within the negative and positive electrolyte chambers. The return manifolds positioned in the negative and positive electrolyte chambers 50 and 52 may include openings therein for delivering the returned electrolyte and entrained gas to the negative and positive electrolyte chambers. The openings may include upper and lower openings in an upper and lower surfaces of the return manifolds. As such, separation of the returning liquid electrolyte and the entrained gases therein may be encouraged, the entrained gases tending to bubble out of the openings at the upper surface while the returning liquid tending to flow out of the lower surface openings. In this way, the first and second return manifolds 214 and 216 can facilitate spontaneous gas/liquid separation, and more homogeneously mixed liquid electrolyte within the integrated multi-chambered electrolyte storage tank 110. By directing returning electrolyte fluid to the return manifolds, separation of the entrained gas from the returning liquid electrolyte can thus be facilitated at 860.

Next, at step 870, method 800 stores the separated entrained gas in a gas head space positioned within the multi-chambered electrolyte storage tank and above the negative and positive liquid electrolyte. After exiting the return manifolds, entrained gas may bubble and exit from the liquid electrolyte, occupying volume thereabove, in the gas head spaces of the negative and positive electrolyte chambers. At step 880, controller 88 may supply gas from the gas head spaces to the negative and positive rebalancing reactors for carrying out the rebalancing reactions. In one example, gas flow rate may be directed and controlled from the multi-chambered electrolyte storage tank 110 to one or more rebalancing reactors by way of a mass flow meter, injector, or pressure regulator. After 880, method 800 ends.

Thus, in one example, a method of operating a redox flow battery system may include directing negative electrolyte from a negative electrolyte chamber positioned in a multi-chambered electrolyte storage tank to a negative electrode compartment of a redox flow battery cell, and directing positive electrolyte from a positive electrolyte chamber positioned in a multi-chambered electrolyte storage tank to a positive electrode compartment of a redox flow battery cell, wherein the negative electrolyte in the negative electrolyte chamber and the positive electrolyte in the positive electrolyte chamber are separated by a bulkhead within the multi-chambered electrolyte storage tank. A first example of the method may optionally include returning liquid electrolyte and entrained gas therein from the redox flow battery cell to submersed positions within the negative and positive electrolyte of the negative and positive electrolyte chambers, respectively. A second example of the method optionally includes the first method, and further includes separating the entrained gas from the returning liquid within the negative electrolyte chamber and the positive electrolyte chamber. A third example of the method optionally includes the first and second examples, and further includes wherein separating the entrained gas from the returning liquid includes separating the entrained gas from the returning liquid without moving mechanical devices. A fourth example of the method optionally includes the first through third examples, and further includes storing the separated entrained gas in a gas head space above the negative and positive electrolyte of the negative and positive electrolyte chambers, respectively, wherein the gas head space is positioned in the multi-chambered electrolyte storage tank. A fifth example of the method optionally includes the first through fourth examples, and further includes delivering gas from the gas head space to negative and positive rebalancing reactors fluidly coupled between the negative and positive electrolyte chambers and the negative and positive electrode compartments, respectively.

In this way, the technical effect of precluding several auxiliary process units such as gas/liquid separators and dedicated gas storage tanks can be achieved, thereby reducing manufacturing and operational complexity. Furthermore, integrating the electrolyte chambers and gas storage within a single multi-chambered electrolyte storage tank can substantially simplify the redox flow battery system layout and reduce the system footprint. Furthermore, storage of hydrogen gas in a head space above the liquid electrolyte chambers in the multi-chambered electrolyte storage tank allows for spontaneous gas-liquid separation, while providing an inert gas blanket for the liquid electrolyte, thereby reducing oxidation of the liquid electrolyte and reducing capacity losses of the redox flow battery system.

It will be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

Note that the example control and estimation routines included herein can be used with various battery and/or vehicle system configurations. The control methods and routines disclosed herein may be stored as executable instructions in non-transitory memory and may be carried out by the control system including the controller in combination with the various sensors, actuators, and other battery hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the redox flow battery control system, where the described actions are carried out by executing the instructions in a system including the various battery hardware components in combination with the electronic controller.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A redox flow battery system, comprising:
a negative electrolyte chamber fluidly coupled to a negative electrode compartment of a redox flow battery cell,
a positive electrolyte chamber fluidly coupled to a positive electrode compartment of the redox flow battery cell,
a multi-chambered electrolyte storage tank including the negative electrolyte chamber and the positive electrolyte chamber separated by a bulkhead, wherein the bulkhead further includes a spill hole, wherein the spill hole is positioned in an interior of the bulkhead on the bulkhead, and
first and second return inlet pipes fluidly coupled to the negative electrolyte chamber and the positive electrolyte chamber, respectively, wherein the first and second return inlet pipes enter the multi-chambered electrolyte storage tank above the spill hole and are configured to deliver returned fluids to submersed positions below the spill hole in the negative electrolyte chamber and the positive electrolyte chamber, respectively, and wherein the bulkhead is positioned longitudinally between the first and second return inlet pipes,
wherein the multi-chambered electrolyte tank further includes first and second return manifolds, wherein the first and second return inlet pipes are fluidly coupled to the first and second return manifolds, respectively, each of the first and second return manifolds comprising more horizontally oriented pipes fluidly coupled at the submersed positions to the first and second return inlet pipes, respectively, the first and second return inlet pipes comprising more vertically oriented pipes, wherein the more horizontally oriented pipes include upper and lower openings in upper and lower surfaces, respectively, of the more horizontally oriented pipes through which the returned fluids exit the first and second return manifolds.

2. The redox flow battery system of claim 1, wherein the negative and positive electrolyte chambers include negative and positive liquid electrolytes filled to negative and positive liquid threshold levels, respectively, and wherein the negative and positive liquid electrolytes are separated by the bulkhead.

3. The redox flow battery system of claim 1, wherein the multi-chambered electrolyte storage tank further comprises a gas head space, the gas head space positioned above and fluidly coupled without piping to both the negative and positive liquid electrolytes.

4. The redox flow battery system of claim 3, wherein the spill hole is positioned at the bulkhead above negative and positive liquid electrolyte levels and fluidly contacting the gas head space, and wherein the negative and positive electrode compartments would be fluidly decoupled in an absence of the spill hole.

5. The redox flow battery system of claim 4, wherein the bulkhead comprises a vertical rigid panel occupying a transverse cross section of the multi-chambered electrolyte storage tank excluding a cross section of the spill hole.

6. The redox flow battery system of claim 1, wherein the spill hole is spaced away from an upper surface of the multi-chambered electrolyte storage tank.

7. The redox flow battery system of claim 1, wherein a perimeter of the spill hole is discontinuous with interior walls of the multi-chambered electrolyte storage tank.

8. The redox flow battery system of claim 1, wherein the multi-chambered electrolyte storage tank further includes two support saddles, each of the two support saddles wrapping around a partial circumference of a lower external surface of the multi-chambered electrolyte storage tank below the spill hole, wherein the bulkhead is positioned longitudinally between the two support saddles.

9. The redox flow battery system of claim 1, wherein the multi-chambered electrolyte storage tank further includes a first level sensor, a first cable conduit conductively coupled to the first level sensor, a first gas outlet port, a first return flange fluidly coupled to the first return inlet pipe, and a first liquid outlet wherein each of the first level sensor, the first cable conduit, the first gas outlet port, and the first return flange are positioned above the spill hole at the negative electrolyte chamber, and wherein the first liquid outlet is positioned below the spill hole at the negative electrolyte chamber.

10. The redox flow battery system of claim 9, wherein the multi-chambered electrolyte storage tank further includes a second level sensor, a second cable conduit conductively coupled to the second level sensor, a second gas outlet port, a second return flange fluidly coupled to the second return inlet pipe, and a second liquid outlet wherein each of the second level sensor, the second cable conduit, the second gas outlet port, and the second return flange are positioned above the spill hole at the positive electrolyte chamber, and wherein the second liquid outlet is positioned below the spill hole at the positive electrolyte chamber.

11. The redox flow battery system of claim 1, further comprising a housing, a power module, and a power control system, wherein the multi-chambered electrolyte storage tank is positioned at a first side of the housing and the power module and the power control system are positioned at a second side of the housing, the first side and the second side positioned at opposing longitudinal ends of the housing.

12. The redox flow battery system of claim 11, wherein the power module comprises a plurality of electrically connected redox flow battery cell stacks positioned at the second side of the housing, wherein the plurality of electrically connected redox flow battery cell stacks include the redox flow battery cell.

13. The redox flow battery system of claim 11, further comprising a rebalancing reactor positioned between the multi-chambered electrolyte storage tank and the first side of the housing, wherein the rebalancing reactor is fluidly coupled between the multi-chambered electrolyte storage tank and the redox flow battery cell.

* * * * *